United States Patent
Callon

(10) Patent No.: US 8,078,758 B1
(45) Date of Patent: Dec. 13, 2011

(54) AUTOMATIC CONFIGURATION OF SOURCE ADDRESS FILTERS WITHIN A NETWORK DEVICE

(75) Inventor: Ross W Callon, Westford, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 2219 days.

(21) Appl. No.: 10/455,189

(22) Filed: Jun. 5, 2003

(51) Int. Cl.
*G06F 15/16* (2006.01)
(52) U.S. Cl. .... 709/242; 709/220; 709/239; 370/395.21
(58) Field of Classification Search .................. 709/220
See application file for complete search history.

(56) References Cited

U.S. PATENT DOCUMENTS

| | | | |
|---|---|---|---|
| 5,142,531 A * | 8/1992 | Kirby | 370/254 |
| 5,452,294 A * | 9/1995 | Natarajan | 370/351 |
| 5,600,642 A | 2/1997 | Pauwels et al. | |
| 5,805,824 A * | 9/1998 | Kappe | 709/242 |
| 5,845,091 A * | 12/1998 | Dunne et al. | 709/240 |
| 6,055,561 A | 4/2000 | Feldman et al. | |
| 6,266,704 B1 * | 7/2001 | Reed et al. | 709/238 |
| 6,374,303 B1 | 4/2002 | Armitage et al. | |
| 6,477,166 B1 | 11/2002 | Sanzi et al. | |
| 6,493,349 B1 | 12/2002 | Casey | |
| 6,501,754 B1 | 12/2002 | Ohba et al. | |
| 6,507,914 B1 * | 1/2003 | Cain et al. | 726/35 |
| 6,553,028 B1 | 4/2003 | Tang et al. | |
| 6,594,268 B1 | 7/2003 | Aukia et al. | |
| 6,646,989 B1 * | 11/2003 | Khotimsky et al. | 370/238 |
| 6,731,652 B2 | 5/2004 | Ramfelt et al. | |
| 6,735,702 B1 | 5/2004 | Yavatkar et al. | |
| 6,751,218 B1 | 6/2004 | Hagirahim et al. | |
| 6,772,347 B1 | 8/2004 | Xie et al. | |
| 6,778,531 B1 | 8/2004 | Kodialam et al. | |
| 6,807,182 B1 | 10/2004 | Dolphin et al. | |
| 6,879,594 B1 | 4/2005 | Lee et al. | |
| 6,910,148 B1 * | 6/2005 | Ho et al. | 714/4 |
| 6,920,503 B1 | 7/2005 | Nanji et al. | |
| 6,944,127 B1 * | 9/2005 | Burchfiel et al. | 370/392 |
| 6,968,389 B1 | 11/2005 | Menditto et al. | |
| 6,999,459 B1 * | 2/2006 | Callon et al. | 370/400 |
| 7,031,288 B2 * | 4/2006 | Ogier | 370/338 |

(Continued)

FOREIGN PATENT DOCUMENTS

JP 2005/130258 5/2005

(Continued)

OTHER PUBLICATIONS

Notice of Allowance for U.S. Appl. No. 10/281,446, mailed Dec. 17, 2009, 16 pp.

(Continued)

*Primary Examiner* — Patrice Winder
(74) *Attorney, Agent, or Firm* — Schumaker & Sieffert, P.A.

(57) ABSTRACT

Techniques are described for automatically setting source address filters within a network device. For example, an apparatus, such as a router, comprises a network interface card to receive routing information from a network device. The routing information specifies at least one unselected network route to a network destination, and includes a tag associated with the unselected route to indicate that the network device does not forward outbound data along the unselected route. The apparatus further comprises a control unit to automatically set a filter to receive inbound data from the network destination specified by the non-selected route. The control unit may automatically set, for example, a source address filter.

14 Claims, 10 Drawing Sheets

U.S. PATENT DOCUMENTS

| | | |
|---|---|---|
| 7,035,226 B2 | 4/2006 | Enoki et al. |
| 7,039,687 B1 | 5/2006 | Jamieson et al. |
| 7,080,161 B2 | 7/2006 | Leddy et al. |
| 7,082,102 B1 | 7/2006 | Wright |
| 7,120,931 B1 | 10/2006 | Cheriton |
| 7,133,928 B2 | 11/2006 | McCanne |
| 7,139,242 B2 | 11/2006 | Bays |
| 7,154,889 B1 | 12/2006 | Rekhter et al. |
| 7,215,637 B1 | 5/2007 | Ferguson et al. |
| 7,251,218 B2 | 7/2007 | Jorgensen |
| 7,269,135 B2 | 9/2007 | Frick et al. |
| 7,281,058 B1 | 10/2007 | Shepherd et al. |
| 7,299,296 B1 | 11/2007 | Lo et al. |
| 7,330,468 B1 | 2/2008 | Tse-Au |
| 7,333,491 B2 | 2/2008 | Chen et al. |
| 7,359,328 B1 | 4/2008 | Allan |
| 7,360,084 B1 | 4/2008 | Hardjono |
| 7,366,894 B1 | 4/2008 | Kalimuthu et al. |
| 7,418,003 B1 | 8/2008 | Alvarez et al. |
| 7,421,487 B1 | 9/2008 | Peterson et al. |
| 7,423,995 B1 * | 9/2008 | Elliott et al. .................. 370/332 |
| 7,463,591 B1 | 12/2008 | Kompella et al. |
| 7,467,227 B1 | 12/2008 | Nguyen et al. |
| 7,477,642 B2 | 1/2009 | Aggarwal et al. |
| 7,483,439 B2 | 1/2009 | Shepherd et al. |
| 7,519,010 B1 | 4/2009 | Aggarwal et al. |
| 7,522,599 B1 | 4/2009 | Aggarwal et al. |
| 7,522,600 B1 | 4/2009 | Aggarwal et al. |
| 7,545,735 B1 | 6/2009 | Shabtay et al. |
| 7,558,219 B1 | 7/2009 | Aggarwal et al. |
| 7,558,263 B1 | 7/2009 | Aggarwal et al. |
| 7,564,803 B1 | 7/2009 | Minei et al. |
| 7,564,806 B1 | 7/2009 | Aggarwal et al. |
| 7,570,604 B1 | 8/2009 | Aggarwal et al. |
| 7,570,605 B1 | 8/2009 | Aggarwal et al. |
| 7,593,321 B2 * | 9/2009 | Galand et al. .................. 370/218 |
| 7,831,733 B2 * | 11/2010 | Sultan et al. .................. 709/238 |
| 2002/0071390 A1 | 6/2002 | Reeves et al. |
| 2002/0101819 A1 | 8/2002 | Goldstone |
| 2002/0118644 A1 | 8/2002 | Moir |
| 2002/0181477 A1 | 12/2002 | Mo et al. |
| 2002/0186664 A1 | 12/2002 | Gibson et al. |
| 2002/0191584 A1 | 12/2002 | Korus et al. |
| 2002/0198687 A1 * | 12/2002 | Dewan et al. .................. 702/189 |
| 2003/0012215 A1 | 1/2003 | Novaes |
| 2003/0014665 A1 | 1/2003 | Anderson et al. |
| 2003/0016672 A1 * | 1/2003 | Rosen et al. .................. 370/392 |
| 2003/0021282 A1 | 1/2003 | Hospodor |
| 2003/0031175 A1 | 2/2003 | Hayashi et al. |
| 2003/0043772 A1 | 3/2003 | Mathis et al. |
| 2003/0056007 A1 | 3/2003 | Katsube et al. |
| 2003/0063591 A1 | 4/2003 | Leung et al. |
| 2003/0087653 A1 | 5/2003 | Leung et al. |
| 2003/0088696 A1 | 5/2003 | McCanne |
| 2003/0099235 A1 | 5/2003 | Shin et al. |
| 2003/0112748 A1 | 6/2003 | Puppa et al. |
| 2003/0118029 A1 * | 6/2003 | Maher, III et al. ....... 370/395.21 |
| 2003/0123446 A1 | 7/2003 | Muirhead et al. |
| 2003/0172114 A1 | 9/2003 | Leung |
| 2003/0177221 A1 | 9/2003 | Ould-Brahim et al. |
| 2003/0191937 A1 | 10/2003 | Balissat et al. |
| 2003/0212900 A1 | 11/2003 | Liu et al. |
| 2004/0037279 A1 | 2/2004 | Zelig et al. |
| 2004/0047342 A1 | 3/2004 | Gavish et al. |
| 2004/0081154 A1 | 4/2004 | Kouvelas |
| 2004/0151180 A1 | 8/2004 | Hu et al. |
| 2004/0151181 A1 | 8/2004 | Chu et al. |
| 2004/0190517 A1 | 9/2004 | Gupta et al. |
| 2004/0218536 A1 | 11/2004 | Yasukawa et al. |
| 2004/0240445 A1 | 12/2004 | Shin et al. |
| 2004/0240446 A1 | 12/2004 | Compton |
| 2005/0001720 A1 | 1/2005 | Mason et al. |
| 2005/0018693 A1 | 1/2005 | Dull |
| 2005/0097203 A1 | 5/2005 | Unbehagen et al. |
| 2005/0108419 A1 | 5/2005 | Eubanks |
| 2005/0111351 A1 | 5/2005 | Shen |
| 2005/0169270 A1 | 8/2005 | Mutou et al. |
| 2005/0220132 A1 | 10/2005 | Oman et al. |
| 2005/0232193 A1 | 10/2005 | Jorgensen |
| 2005/0262232 A1 | 11/2005 | Cuervo et al. |
| 2005/0265308 A1 | 12/2005 | Barbir et al. |
| 2005/0271035 A1 | 12/2005 | Cohen et al. |
| 2005/0271036 A1 | 12/2005 | Cohen et al. |
| 2005/0281192 A1 | 12/2005 | Nadeau et al. |
| 2006/0013141 A1 | 1/2006 | Mutoh et al. |
| 2006/0039364 A1 | 2/2006 | Wright |
| 2006/0088031 A1 | 4/2006 | Nalawade |
| 2006/0126496 A1 | 6/2006 | Filsfils et al. |
| 2006/0147204 A1 | 7/2006 | Yasukawa et al. |
| 2006/0153067 A1 | 7/2006 | Vasseur et al. |
| 2006/0164975 A1 | 7/2006 | Filsfils et al. |
| 2006/0182034 A1 | 8/2006 | Klinker et al. |
| 2006/0221958 A1 | 10/2006 | Wijnands et al. |
| 2007/0036162 A1 | 2/2007 | Tingle et al. |
| 2007/0098003 A1 | 5/2007 | Boers et al. |
| 2007/0124454 A1 | 5/2007 | Watkinson |
| 2007/0140107 A1 | 6/2007 | Eckert et al. |
| 2008/0056258 A1 | 3/2008 | Sharma et al. |
| 2008/0123524 A1 | 5/2008 | Vasseur et al. |
| 2008/0123654 A1 | 5/2008 | Tse-Au |
| 2009/0028149 A1 | 1/2009 | Yasukawa et al. |

FOREIGN PATENT DOCUMENTS

| | | |
|---|---|---|
| JP | 2005/167482 | 6/2005 |
| JP | 2005-252385 | 9/2005 |
| KR | 2004/001206 A | 1/2004 |
| WO | 2004/071032 A1 | 8/2004 |

OTHER PUBLICATIONS

Office Action from U.S. Appl. No. 12/125,997, dated Feb. 9, 2010, 16 pp.

Aggarwal et al., "Establishing Point to Multipoint MPLS TE LSPs," submitted to Internet Engineering Task Force (IETF) Feb. 11, 2007, pp. 1-15.

Atlas et al., "MPLS RSVP-TE Interoperability for Local Protection/Fast Reroute," IETF, Jul. 2001, pp. 1-14.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

Eric C. Rosen et al., "Multicast in MPLS/BGP IP VPNs," draft-rosen-vpn-mcast-07.txt, May 2004, 27 pgs.

Gibson, Steve, "DRDoS—Description and Analysis of a Potent, Increasingly Prevalent, and Worrisome Internet Attack," Gibson Research Corporation, Feb. 2002, www.grc.com/dos/drdos.htm.

K. Kompella et al., "Virtual Private LAN Service," draft-ietf-l2vpn-vpls-bgp-00.txt, May 2003, 22 pgs.

Lougheed, K., "A Border Gateway Protocol (BGP)", Jun. 1990, RFC 1105, pp. 1-37.

RSVP-TE: Resource Reservation Protocol—Traffic Extension, Javvin Company, 2 pgs, printed Apr. 18, 2005. http://www.javvin.com/protocolRSVPTE.html.

Satyanarayana et al., "Extensions to GMPLS RSVP Graceful Restart", draft-aruns-ccamp-restart-ext-01.txt, Jul. 2004, Network Working Group Internet Draft, p. 12.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

U.S. Appl. No. 10/080,865, entitled "Distributed Filtering for Networks", filed Feb. 21, 2002, Ross Callon.

U.S. Appl. No. 10/234,455, entitled "Systems and Methods for Identifying Sources of Network Attacks", filed Sep. 5, 2002, Ben Eater, Rob Jaeger.

U.S. Appl. No. 10/246,244, entitled "Filtering Data Flows Based on Associated Forwarding Tables," filed Sep. 18, 2002, Jeffrey Lo, Scott Mackie.

U.S. Appl. No. 10/281,446, entitled "Dynamically Inserting Filters Into Forwarding Paths of a Network Device," filed Oct. 25, 2002, Scott Mackie.

U.S. Appl. No. 10/361,715, entitled "Automatic Filtering to Prevent Network Attacks," filed Feb. 7, 2003, Bruno Rijsman.

U.S. Appl. No. 10/431,395, entitled "Rate Limiting Data Traffic in a Network", filed May 8, 2003, Ross Callon et al.

U.S. Appl. No. 11/056,383, entitled "Fast Reroute of Traffic Associated With a Point to Multi-Point Network Tunnel," filed Feb. 10, 2005.

U.S. Appl. No. 11/192,432, entitled "Transmission of Layer Two (L2) Multicast Traffic Over Multi-Protocol Label Switching Networks," filed Jul. 28, 2005.

U.S. Appl. No. 11/213,637, entitled "Aggregate Multicast Trees For Virtual Private Local Area Network (LAN) Service Multicast," filed Aug. 26, 2005.

U.S. Appl. No. 11/213,638, entitled "Shared Multicast Trees for Multicast Virtual Private Networks," filed Aug. 26, 2005.

U.S. Appl. No. 11/213,639, entitled "Exchange of Control Information for Virtual Private Local Area Network (LAN) Service Multicast," filed Aug. 26, 2005.

U.S. Appl. No. 11/213,640, entitled "Auto-Discover of Multicast Virtual Private Networks," filed Aug. 26, 2005.

U.S. Appl. No. 12/499,606, entitled "Point to Multi-Point Label Switched Paths With Label Distribution Protocol," filed Jul. 9, 2009.

Y. Rekhter et al., "A Border Gateway Protocol 4 (BGP-4)," Mar. 1995, 72 pgs.

Yasukawa et al. "Requirements for Point to Multipoint extension to RSVP-TE," IETF, Oct. 2003, pp. 1-20.

Response to Office Action from U.S. Appl. No. 12/125,997, dated May 10, 2010, 12 pp.

* cited by examiner

AUTOMATIC CONFIGURATION OF SOURCE ADDRESS FILTERS WITHIN A NETWORK DEVICE

TECHNICAL FIELD

The invention relates to computer networks and, more particularly, to configuration of network traffic filters within computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an inbound packet, the router examines information within the packet and forwards the packet in accordance with the routing information.

Large computer networks, such as the Internet, often include many routers grouped into administrative domains called "autonomous systems." In order to maintain an accurate representation of the network, routers periodically exchange routing information. In particular, a conventional router typically issues a communication in accordance with a routing protocol to "announce" network destinations that are reachable through that router. These "destination announcements" typically take the form of a set of routes that specifies network destinations that can be reached through the announcing router. The routing protocols generally fall into two categories. Routers located at the edges of different autonomous systems generally use exterior routing protocols to announce routes to reachable destinations, and to find out about routes to other destinations outside of their autonomous system. One example of an exterior routing protocol is the Border Gateway Protocol (BGP). Routers within an autonomous system generally utilize interior routing protocols to advertise and compute routes to reachable destinations within the autonomous system. One example of an interior routing protocol is the Intermediate System to Intermediate System (ISIS) protocol, which is an interior gateway routing protocol for IP networks for communicating link-state information within an autonomous system. Other examples of interior routing protocols include the Open Shortest Path First (OSPF), and the Routing Information Protocol (RIP). Routers within an autonomous system may also make use of exterior routing protocols such as BGP in order to inform other routers in the same autonomous system about routes to destinations outside of the autonomous system.

Conventional routers often maintain the routing information in the form of one or more routing tables or other data structures. The form and contents of the routing tables often depends on the routing algorithm implemented by the router. Typically, after exchanging routing information, the router processes the information and selects a route to each network destination. In instances where multiple routes exist to a common destination, the router may select one of the routes based on a variety of criteria, such as the routing protocol by which the route was learned, metric values advertised in the routing protocols, the speed of links along the routes, number of hops between source and destination, proximity of next hops to the router, and the like. When sharing information with peer routers, the router announces those network destinations and routes selected by the router, and does not announce "non-selected" routes.

Devices attached to a network may be susceptible to a network attack, such as a denial of service (DOS) attack, which occurs when a malicious party directs a high volume of packets to the device in an attempt to sabotage network operation. The high traffic volume can overwhelm the device, leaving it unable to process the inbound packets. For example, in one type of DOS attack, a perpetrator sends a large number of "ping" requests to network multicast or broadcast addresses, which are special addresses used to broadcast messages to multiple other devices on the network. When sending the requests, the perpetrator spoofs the source address of a device targeted by the attack. In response to the requests, the other network devices reply to the targeted device, thereby inundating the targeted device with packets. Such attacks may be directed to any device attached to the network, including but not limited to routing devices.

Conventional approaches for prevention of network attacks typically rely on application of packet filters. For example, a router may apply source address filters to restrict which source network addresses a device or a network of devices attached to the router can use to send packets, thereby reducing the susceptibility to devices ability to launch attacks using a false source address. In many cases, a router may configure source address filters to be applied to an inbound packet stream from a peer router based on the destinations advertised by that peer router. In other words, the router may configure one or more source address filters to permit only those packets having source addresses that match the reachable destinations announced by that peer router. In this manner, source address filters may be applied in a manner that maintains packet forwarding for valid source addresses while dropping potentially spoofed source addresses.

However, in some situations, a peer router may erroneously configure source address filters to drop packets having legitimate source addresses. For example, when a router selects one of multiple routes to a network destination, only the selected routes are advertised to the peer routers. The peer routers receiving the routing information specifying the selected routes configure the source address filters to accept packets from sources along those routes, and drop packets originating from valid sources along the non-selected routes. As a result, a system administrator may configure the peer routes to avoid the use of source address filters, which leads to compromised network security and increased vulnerability to network attacks.

SUMMARY

In general, the invention is directed to techniques for automatically configuring source address filters within network devices, such as network routers. The techniques involve the exchange of routing information that specifies "non-selected" routes, i.e., routes along which a router does not forward packets, but from which packets may be received. As described, the inclusion of non-selected routes by an announcing router may aid peer routers in defining a more accurate network topology, and thus may allow the peer routers to more accurately configure source address filters. For example, the peer routers may automatically configure source address filters based on the received routing information, including configuring the source address filters to permit packets from destinations associated with the non-selected routes. Consequently, the peer routers may configure the source address filters to maintain security measures to prevent malicious packets from being forwarded, while reducing and possibly eliminating the volume of packets that are dropped even though the packets have legitimate source addresses.

In one embodiment, a method comprises receiving information from a network device that specifies at least one unselected network route along which the network device does not forward outbound data. The method further comprises setting a filter to receive inbound data from a network destination specified by the non-selected route in response to the received information.

In another embodiment, a method communicating routing information to a network device. The routing information specifies a network route and includes a tag that identifies the network route as a non-selected network route from which inbound packets will be accepted and along which outbound packets will not be forwarded.

In another embodiment an apparatus comprises a network interface card to receive routing information from a network device that specifies at least one unselected network route to a network destination, wherein the routing information includes a tag associated with the unselected route to indicate that the network device does not forward outbound data along the unselected route. The apparatus further comprises a control unit to set a filter to receive inbound data from the network destination specified by the non-selected route.

In another embodiment, a router comprises a control unit to generate routing information to specify a network route and include a tag that identifies the network route as a non-selected network route from which inbound packets will be accepted and along which outbound packets will not be forwarded. The router further comprises an interface card to communicate the routing information to a network device.

In another embodiment, a computer-readable medium comprising instructions to cause a processor to receive from a network device routing information in accordance with a routing protocol, wherein the routing information specifies at least one unselected network route along which the network device does not forward outbound packets. The computer-readable medium further comprises instructions to cause the processor to add a network destination specified by the non-selected route to a set of source addresses associated with a source address filter, and apply the source address filter to inbound packets.

In another embodiment, a computer-readable medium comprising instructions to cause a control unit of a network device to process data describing a network topology to identify at least one selected network route for forwarding outbound packets and at least one unselected network route along which the network device will not forward the outbound packets. The computer-readable medium further comprises instructions to cause the control unit to generate routing information that includes tags to identify the selected network route and the unselected network route.

The techniques may provide one or more advantages. For example, by exchanging routing information that specifies non-selected routes, routers may automatically configure source address filters to permit packets originating from destinations along the non-selected routes. As a result, the techniques may reduce or eliminate the dropping of packets having legitimate source addresses while maintaining network security.

Moreover, an administrator need not manually configure the source address filters to permit traffic originating from valid network destinations along non-selected routes, thereby avoiding a time-consuming, potentially error-prone process. In accordance with the invention, the information can be seamlessly incorporated into routing information exchanged between routers, and recipient routers can automatically configure the source address filters based on the exchanged information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
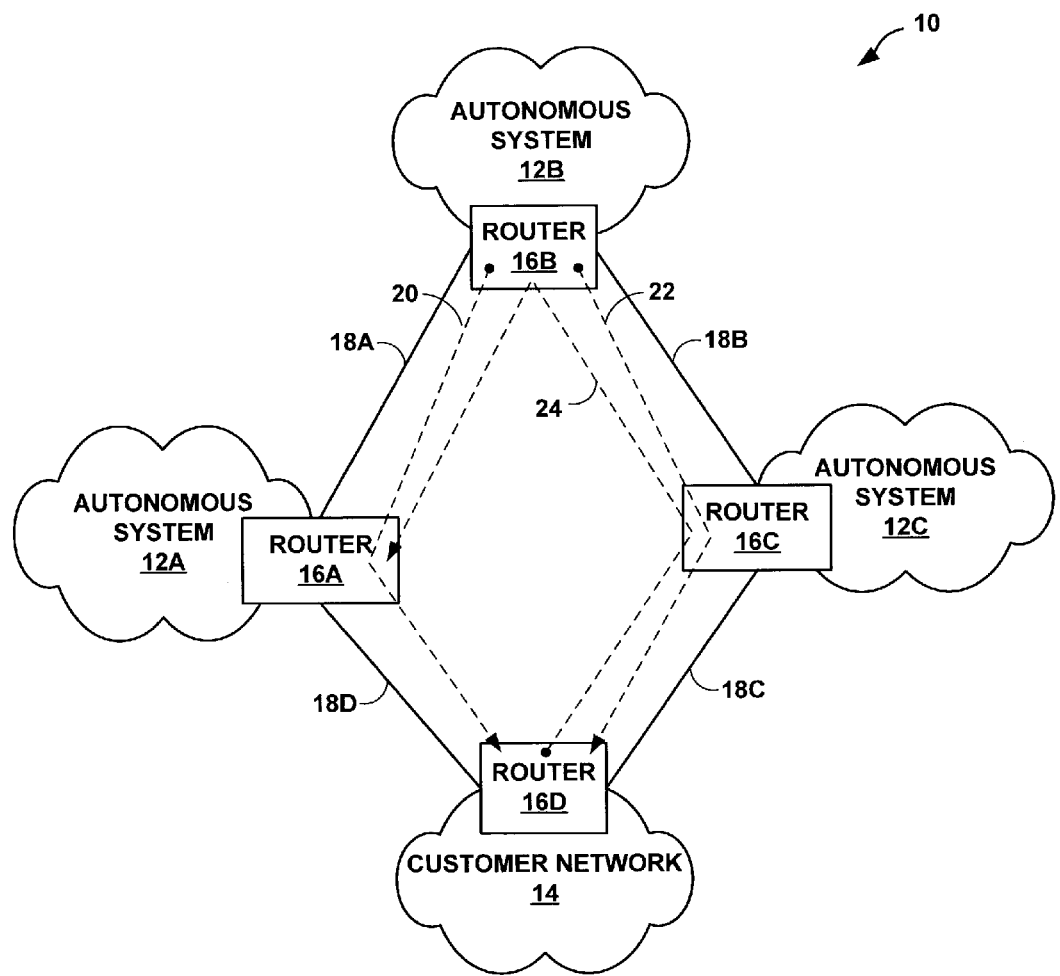
FIGS. 1-4 are block diagrams illustrating example network environments that demonstrate the principles of the invention.

FIG. 1 is a block diagram illustrating an example network environment 10 that demonstrates the principles of the invention. As illustrated, autonomous systems 12A-12C ("autonomous systems 12") and customer network 14 are connected by a plurality of physical links 18A-18D (solid lines). Each of autonomous systems 12 and customer network 14 comprises a plurality of network devices and computing devices, such as routers, switches, hubs, gateways, servers, desktop computers, network-enabled mobile devices, and the like.

In general, network traffic flows between autonomous systems 12 and customer network 14 via physical links 18. For example, FIG. 1 illustrates network routes 20, 22, 24 (dashed lines), which represent directional flows of network traffic. For exemplary purposes, the principles of the invention are described in reference to a packet-based network. However, the techniques may readily be applied to a cell-based network, frame-based network, or other types of networks.

In accordance with the principles of the invention, autonomous systems 12 and customer network 14 employ techniques to more accurately filter packets within the networks. In particular, routers 16 automatically configure source address filters based on exchanged routing information, which includes information identifying information that specifies "non-selected" routes, i.e., routes along which a router does not forward packets, but from which packets may be received. More specifically, in order to maintain an accurate network topology, routers 16 periodically exchange routing information in accordance with one or more defined routing protocols, such as the Border Gateway Protocol (BGP).

The inclusion of non-selected routes in the exchanged routing information aids routers 16 in defining a more accurate network topology, and thus may allow the routers to more accurately configure source address filters. For example, routers 16 may automatically configure source address filters based on the received routing information, including configuring the source address filters to permit packets originating from network devices associated with the non-selected routes. Consequently, routers 16 may configure the source address filters to maintain security measures to prevent malicious packets from being forwarded, while reducing the volume of packets that are dropped even though the packets have legitimate source addresses.

FIG. 1 illustrates a typical network topological condition in which multiple routes exist between two routers, e.g., network routes 20 and 22 between router 16A and router 16D. As a result, router 16B performs route resolution, and selects one of route 20 and route 22 to reach customer network 14 based on a variety of criteria, such as connection speed, available bandwidth, number of hops between source and destination and the like. For purposes of example, it is assumed that router 16B selects route 20. Consequently, route 20 is referred to as a "selected" route, i.e., a route to a destination that a router selects for forwarding packets to that destination. Moreover, route 22 is referred to as a "non-selected" route, i.e., a route along which router 16B does not forward packets, but from which packets may be received.

In accordance with the principles of the invention, router 1613 announces routing information in accordance with a routing protocol, e.g., BGP, and specifies both selected and non-selected network routes. For example, router 16B provides routing information to router 16A, 16C or both that identifies route 20 as a valid route for reaching router 16D from router 16B. In addition, router 16B announces route 22, and indicates that route 22 is a non-selected route, i.e., a route along which router 16B has not selected for forwarding packets, but from which packets may be received. In other words, in the example of FIG. 1, router 16B indicates that route 22 has not been selected as a forwarding route to reach customer network 14, but other devices along route 22, such as router 16D, may forward packets to autonomous system 12A via router 16B. In this manner, router 16B advertises information to router 16A, 16C or both that specifies at least one non-selected network route along which the first router does not forward outbound packets and having at least one potential source, such as router 16D, of inbound packets.

This inclusion of information describing non-selected routes within the exchanged routing information allows router 16A, for example, to more accurately set source address filters, since known routes, including selected and non-selected routes, are represented by the routing information received from router 16B. Specifically, by including non-selected routes, such as route 22, in announced routing information, router 16B provides information such that router 16A may define a more accurate network topology and, therefore, more accurately configure source address filters. For example, by gaining knowledge of route 22, router 16A may set source address filters associated with link 18A to ensure that network traffic originating from valid sources along route 22 is not dropped. For example, router 16A may configure the source address filters associated with physical link 18A to correctly accept network traffic from router 16D via link 18A the flows to router 16A via route 24.

Figure 2:
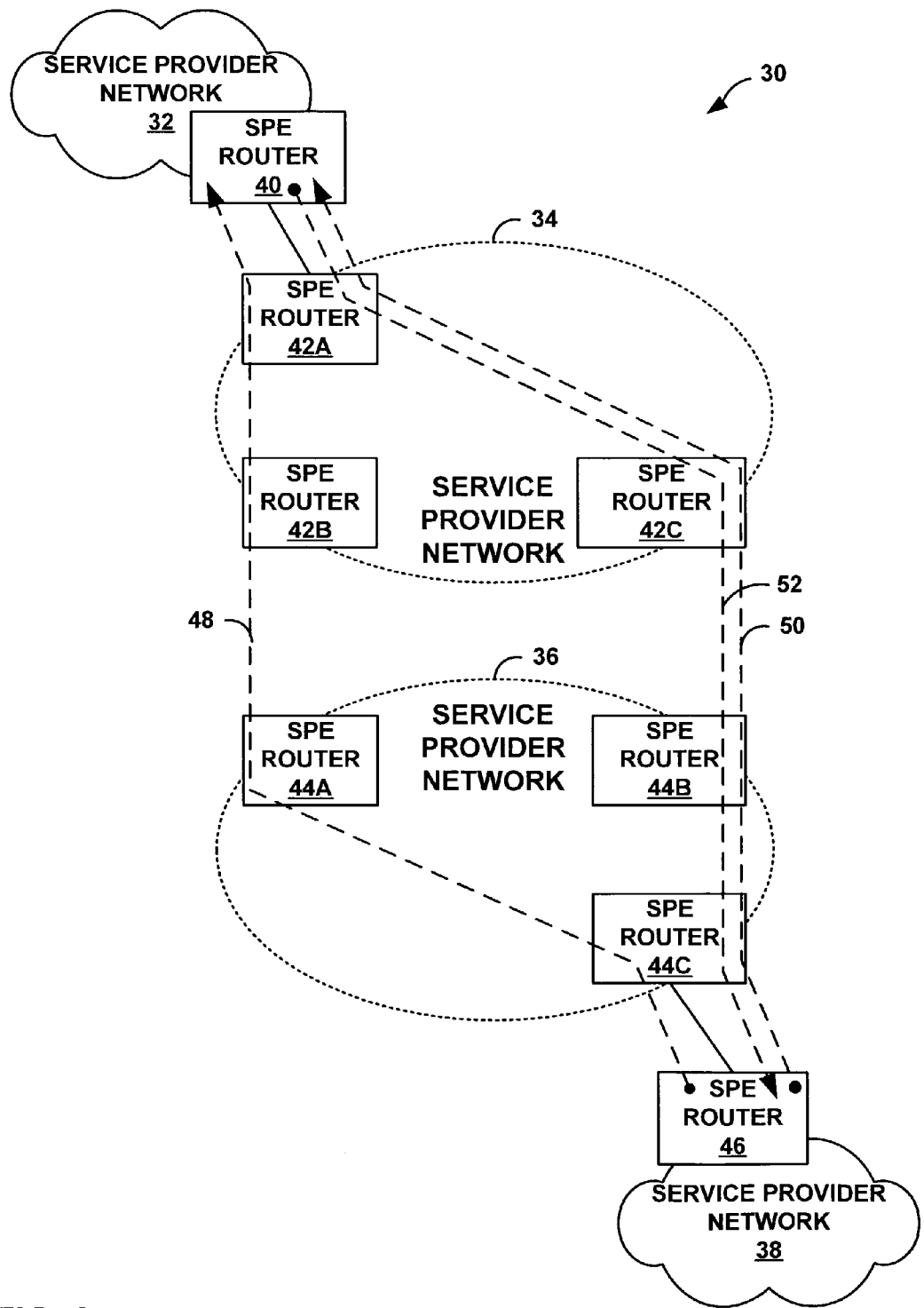

FIG. 2 is a block diagram illustrating another example network environment 30 that illustrates the principles of the invention. In the example of FIG. 2, service provider (SP) network 34 is a high-traffic network characterized by limited bandwidth availability and poor quality of service, while SP networks 32, 36, and 38 are characterized by a good quality of service. As is common, an owner or administrator of SP network 34 enters a contractual agreement with an owner or administrator of SP network 36 such that traffic destined for destinations served by SP network 34 make use of routes through SP network 36 as much as possible, thereby minimizing traffic flow through SP network 34. However, agreements between owners or administrators of SP network 34 and owners or administrators of SP network 32 may not exist, thus allowing SP network 32 to forward packets through SP network 34 by any known route.

For exemplary purposes, it is assumed that route 48 utilizes a shortest route within SP network 34, i.e., a route hat has fewer hops within SP network 34 than route 50. Thus, to maintain the agreement between SP network 34 and SP network 36, SPE router 46 is configured to select and forwards packets along route 48 to SP network 32. SP network 32, however, is not limited by an agreement with SP network 34 and SPE router 40 may, for illustration purposes, select route 52 during route resolution route to forward network traffic through SP networks 34, 36 to SP network 38.

In accordance with the principles of the invention, SPE routers 40, 46 exchange routing information with other known routers via a routing protocol, such as BGP, and specify both selected and non-selected network routes. For example, SPE router 46 may announce route 48 as a selected route and route 50 as a non-selected route, i.e., a route along which a router does not forward data, but from which data may be received.

Upon exchanging the information, SPE routers 42 and 44 configure source address filters based on the selected and non-selected routes specified in exchanged routing information. For example, based on the non-selected route 50 announced by SPE router 46, router 44B configures source address filters to receive via route 52 network traffic bearing valid source addresses. Without knowledge of non-selected route 50, SPE router 44B may not otherwise learn of route 50 to reach SP network 32 due to the contractual agreement, and may have incorrectly configured source address filters to drop network traffic from legitimate sources within SP networks 32 and 34.

Figure 3:
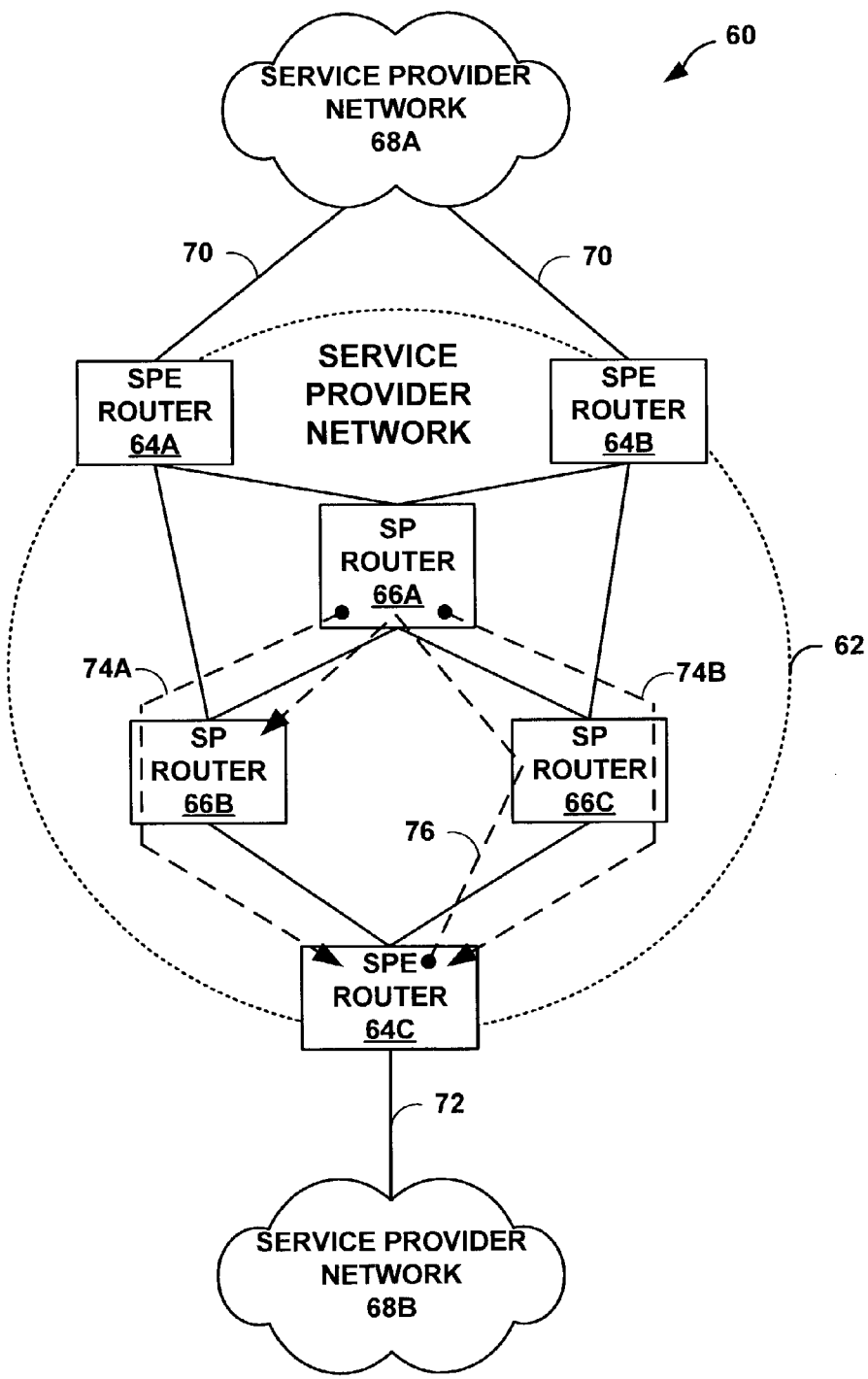

FIG. 3 is a block diagram illustrating another example network environment 60 that demonstrates the principles of the invention. As illustrated, service provider (SP) network 62 is coupled to a plurality of SP networks via links connected to SP edge (SPE) routers 64A, 64B, and 64C. For example, SP network 62 provides network connectivity to a plurality of SP networks 68A and 68B via links 70 and 72, respectively. SPE routers 64A, 64B, 64C ("SPE routers 64") forward network traffic to and from SP networks 68A, 68B while providing more accurate source address filters as discussed above.

In general, SPE routers 64 provide source address filtering to guard against network attacks originating from outside SP network 62. However, these source address filters do not protect against internal attacks. Internal attacks are sent and received by network devices within SP network 62, and may require no routing to SP networks 68A, 68B, 68C. Thus, malicious packets originating from an internal attack may never encounter source address filters active on SPE routers 64.

SP routers 66A, 66B, 66C ("SP routers 66") represent routers internal to SP network 62. SP routers 66, as well as SPE routers 64, utilize internal routing protocols to exchange routing information concerning network routes within SP network 62, and utilize source address filters to prevent internal attacks.

As shown in FIG. 3, SP router 66A may select one of two routes 74A and 74B to forward network traffic to SPE router 64C. For purposes of illustration, it is assumed that SP router 66A selects route 74A. Consequently, route 74A is referred to as a "selected" route, i.e., a route to a destination that router 66A selects for forwarding packets to that destination. Moreover, route 74B is referred to as a "non-selected" route, i.e., a route along which router 66A does not forward packets, but from which packets may be received. In accordance with the principles of the invention, router 66B announces routing information in accordance with an internal routing protocol, such as IS-IS, OSPF, RIP, IGRP, and EIGRP, and identifies both selected and non-selected network routes. In this manner, SP router 66A, for example, advertises unselected network route 74B to SP router 66B.

Upon exchanging the information, SP routers 66 and SPE router 64C configure source address filters based on the selected and non-selected routes specified in exchanged routing information. For example, based on the non-selected route 74B announced by SP router 66A, SP router 66B configures source address filters to receive via route 76, network traffic bearing valid source addresses. Without knowledge of non-selected route 74B, SPE router 44B may not otherwise incorrectly configured source address filters to drop network traffic from legitimate sources along route 74B.

Figure 4:
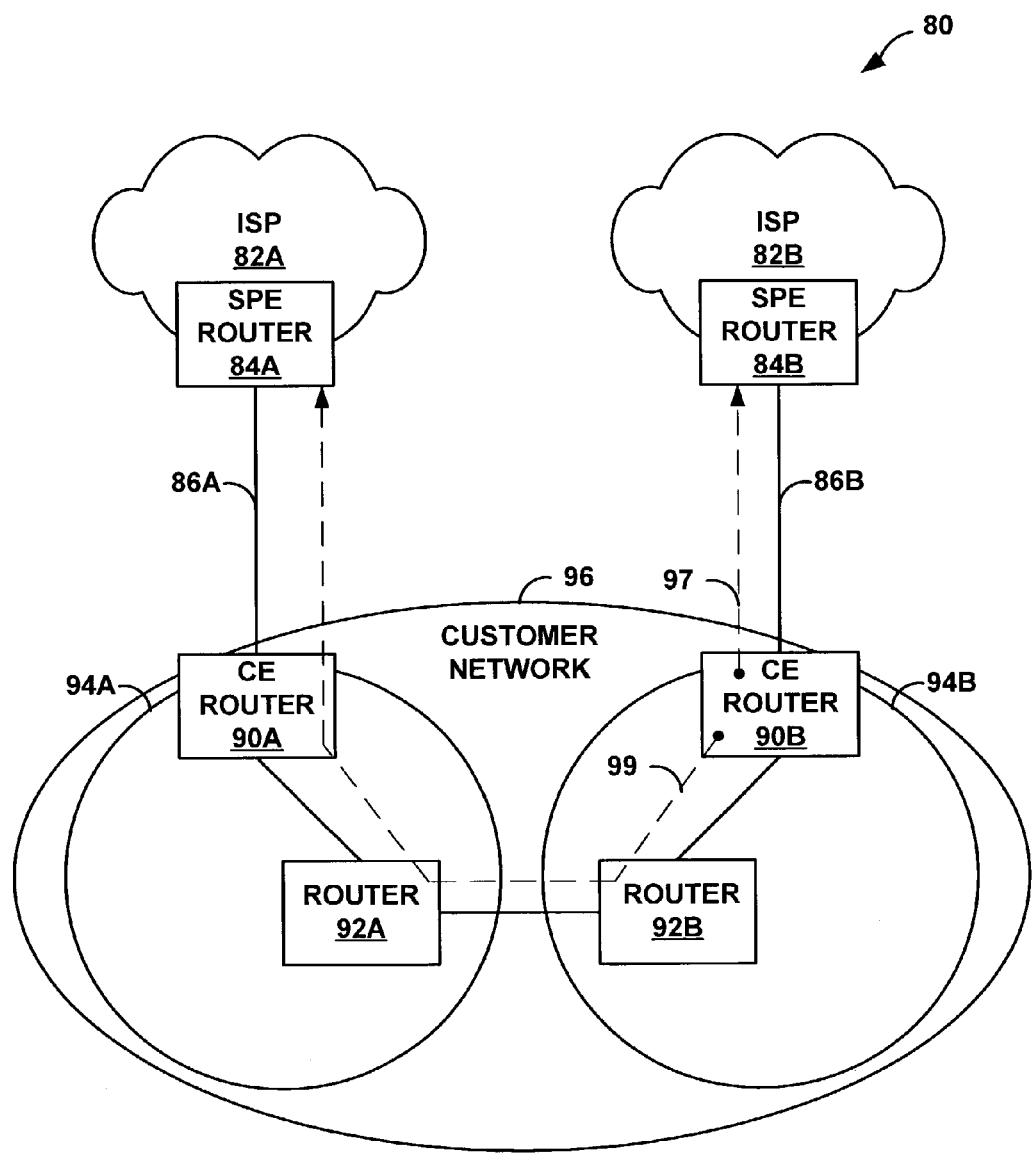

FIG. 4 is a block diagram illustrating an example network environment 80 in which two internet service providers (ISPs) 82A and 82B filter network traffic in accordance with the principles of the invention. As shown in FIG. 4, ISPs 82A, 82B ("ISPs 82") are connected to two network subnets 94A and 94B of customer network 96 via links 86A and 86B, respectively. In particular, links 86A and 86B connects SPE routers 84A and 84B to respective customer edge (CE) routers 90A and 90B. Network subnets 94A and 94B may represent a block of network addresses issued by ISPs 84A and 84B, respectively.

CE router 90A and router 92A service network subnet 94A, while CE router 90B and router 92B service network subnet 94B. CE router 90A and router 92A generally forward outbound network traffic originating from network subnet 94A to ISP 82A via link 86A. Similarly, CE router 90B and router 92B generally forward outbound network traffic originating from network subnet 94B to ISP 82B via link 86B. In this manner, outbound network traffic originating from customer network 96 is distributed between ISPs 82.

In accordance with the principles of the invention, SPE routers 84A and 84B receive from CE routers 90A and 90B, respectfully, routing information identifying both selected and non-selected routes. Based on the selected and non-selected routes, SPE routers 84 automatically configure source address filters to allow network traffic originating from either of network subnet 94A and 94B. For example, CE router 90B informs SPE router 84B of selected route 97 as well as non-selected route 99. In this mariner, SPE router 84B learns of legitimate sources along route 99, and configures source address filters associated with link 86B to receive packets from those sources.

Consequently, in the event of failure of ISP 82A, traffic originating from network subnet 94A may be rerouted to ISP 82B without risk of that traffic being dropped by erroneously configured source address filters.

Figure 5:
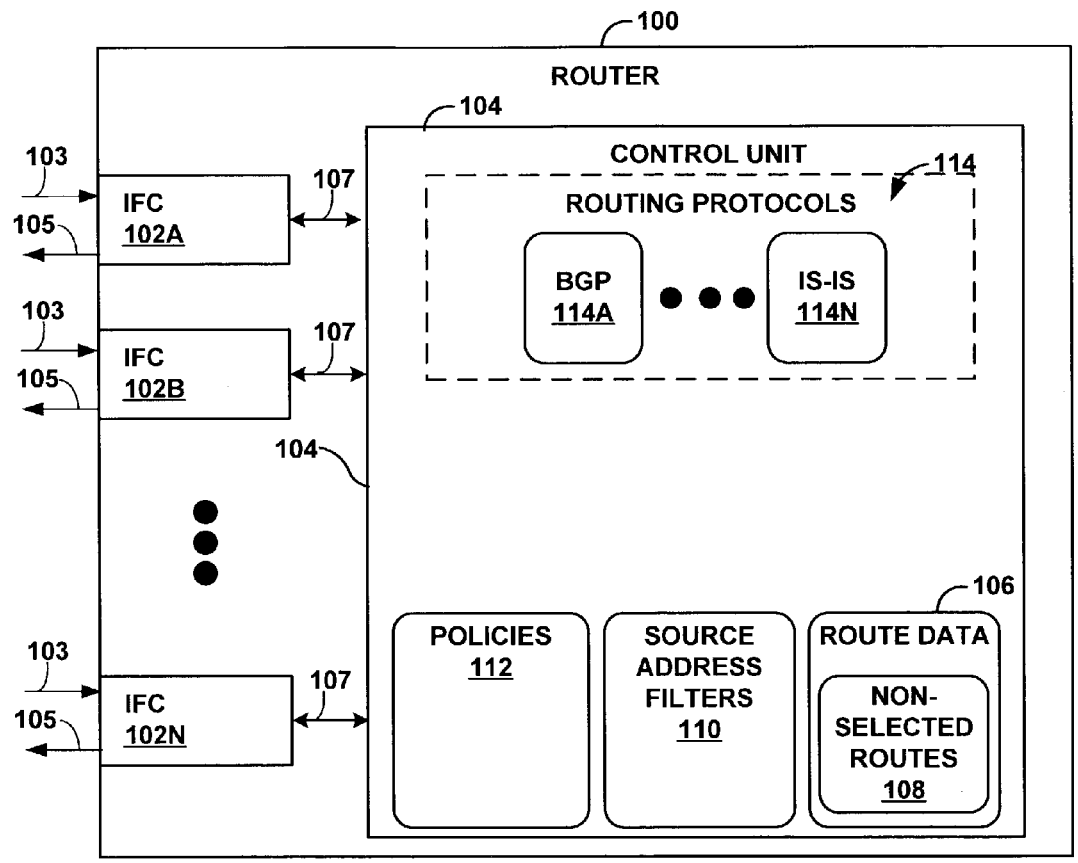
FIG. 5 is a block diagram illustrating an exemplary embodiment of a router that filters packets in accordance with the principles of the invention.

FIG. 5 is a block diagram illustrating an exemplary embodiment of router 100 that automatically configures source address filters in accordance with the principles of the invention. As described in more detail below, router 100 generates routing information that identifies both selected and non-selected routes, and exchanges the routing information with other routers via one or more routing protocols 114.

As illustrated, router 100 includes interface cards (IFCs) 102A-102N (collectively "IFCs 102") that receive and send packet flows via network links 103 and 105, respectively. IFCs 102 are typically coupled to network links 103 and 105 via a number of interface ports (not shown), and forward and receive packets and routing information to and from control unit 104 via respective interfaces 107. Router 100 may include a chassis (not shown) having a number of slots for receiving a set of cards, including IFCs 102. Each card may be inserted into a corresponding slot of a chassis for electrically coupling the card to control unit 104 via a bus, backplane, or other electrical communication mechanism.

In general, router 100 receives inbound packets from network links 103, determines destinations for the received packets, and outputs the packets on network links 105 based on the destinations. More specifically, control unit 104 receives routing information from other routing devices that describes a topology of a network environment and, in particular routes through one or more networks within the environment. Based on the routing information, router 100 generates route data 106 that describes the routes, including both selected routes as well as non-selected routes 108. As described above, a selected route refers to a route along which router 100 forwards packets to reach one or more destinations. A "non-selected" route refers to route of which router 100 has knowledge and along which has elected not to forward packets. Control unit 104 may maintain route data 106, including non-selected routes 108, in the form of one or more tables, databases, link lists, radix trees, databases, flat files, or any other data structure.

Routing protocols 114 represent various protocols by which router 100 exchanges routing information, identifying both selected and non-selected routes, with other routing devices, thereby learning the topology of the network, i.e., the routes through the network. Routing protocols may include exterior routing protocols to exchange routing information with routers of other domains or autonomous systems, e.g. BGP routing protocol 114A. In addition, router 100 may include interior routing protocols, e.g., IS-IS routing protocol 114N to learn of routes within a network, an autonomous system, a domain and the like. Router 100 may exchange routing information in accordance with policies 112, which may identify a first set of routers for receiving both selected and non-selected routers and a second set of routers for receiving only the selected routes.

Based on routing information received from other peer routers, control unit 104 processes the information to update route data 106 and source address filters 110. In accordance with the principles of the invention, control unit 104 processes the routing information to configure source address filters 110 to accept packets from destination addresses specified by the selected or non-selected routes. In this manner, router 100 may maintain a more accurate representation of the topology of the network as represented by route data 106, since all known routes, both selected and non-selected, are present within route data 106. This more accurate representation of the network topology may allow router 100 to set source address filters 110 to more accurately forward valid packets.

IFCs 102 may receive inbound packets from one of autonomous networks 12 (FIG. 1), customer network 14, SP networks 32, 34, 36, 38 (FIG. 2), network sets 94A, 94B (FIG. 4) or ISPs 82. Upon receiving an inbound packet via one of links 103, a respective one of IFCs 102 relays the packet to control unit 104. In response, control unit 104 reads a block of data from the packet, referred to as the "key," that includes a network source for the packet. The key may, for example, contain a source address corresponding to a network device within the network. Control unit 104 compares the source address against a set of addresses specified by source address filters 110, and selectively forwards the packets based on the comparison.

The architecture of router 100 illustrated in FIG. 5 is for exemplary purposes only, and the principles of the invention are not limited to this architecture. Router 100 may operate according to executable instructions fetched from one or more computer-readable media. Examples of such media include random access memory (RAM), read-only memory (ROM), non-volatile random access memory (NVRAM), electrically erasable programmable read-only memory (EE-PROM), flash memory, and the like. The functions of router 100 may be implemented by executing the instructions of the computer-readable medium with one or more processors, discrete hardware circuitry, firmware, software executing on a programmable processor, or a combination of any of the above.

Figure 6:
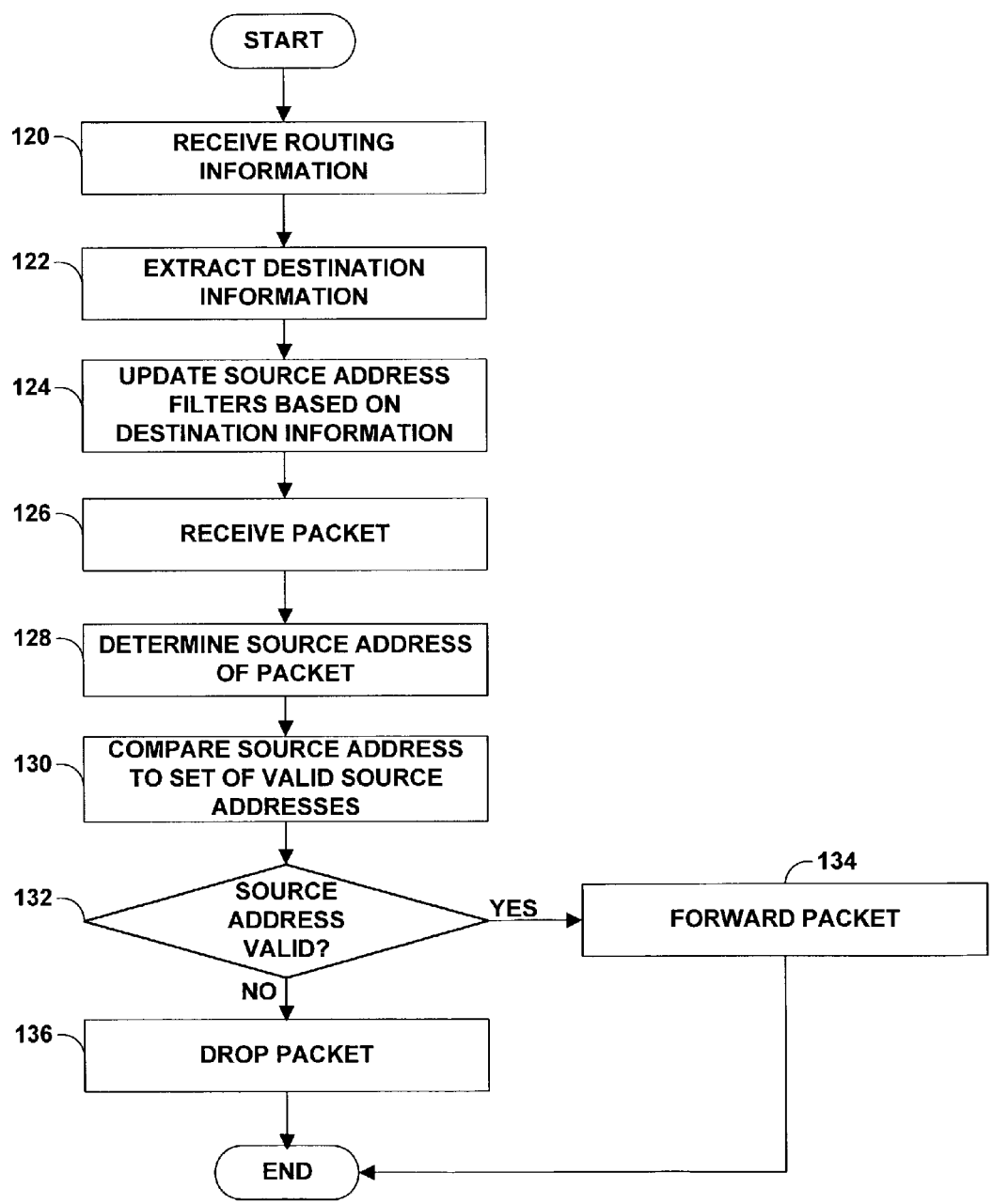
FIG. 6 is a flow chart illustrating example operation of a router configuring source address filters in accordance with the principles of the invention.

FIG. 6 is a flow chart illustrating example operation of a router, e.g., router 100, automatically setting source address filters in accordance with the principles of the invention. Upon receiving routing information (120), including information regarding non-selected routes, control unit 104 of router 100 extracts destination information for both selected and non-selected routes (122).

Control unit 104 updates a set of valid source addresses for source address filters 110 based on the extracted destination information (124). Next, upon receiving a packet (126), control unit 104 determines the source address of the packet (128) by reading a block of data from the packet. Control unit 104 accesses source address filters 110 and compares the set of valid source addresses associated with the link from which the packet was received to the source address of the packet to determine whether the source address of the packet is valid (130).

If the source address of the packet is valid (132), control unit 104 forwards the packet along a selected route specified in route data 106 (134). However, if the source address does not match a specified valid source address, control unit 104 drops the packet under the valid assumption that spoofed source addresses signal packets with malicious intent (136).

Figure 7:
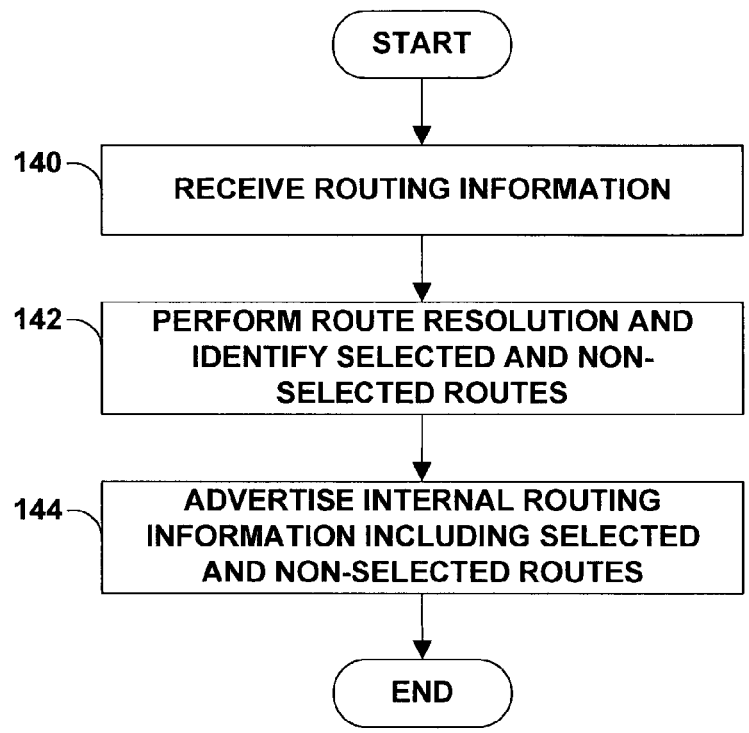
FIG. 7 is a flow chart illustrating example operation of a router generating routing information in accordance with the principles of the invention.

FIG. 7 is a flow chart illustrating example operation of router 100 generating routing information in accordance with the principles of the invention. Upon receiving routing information (140) via one or more of routing protocols 114, control unit 104 processes the routing information and updates route data 106 to reflect the network topology.

Next, router 100 executes route resolution to select routes to known destinations (142). During this process, router 100 may associate tags with routes identified by route data 106 to indicate selected and non-selected routes. Control unit 104 may select routes based on a variety of route characteristics, as discussed above. Router 100 may advertise the routing information, includes information specifying selected routes and non-selected routes, to other peer routers (144). Prior to advertising the routing information, control unit 104 may apply policies 112, which determine a distribution of the advertisement of the selected routes throughout a network. Thus, control unit 104 may omit information regarding certain non-selected routes, as specified by policies 112, from the advertised routing information for certain network devices.

Figure 8:
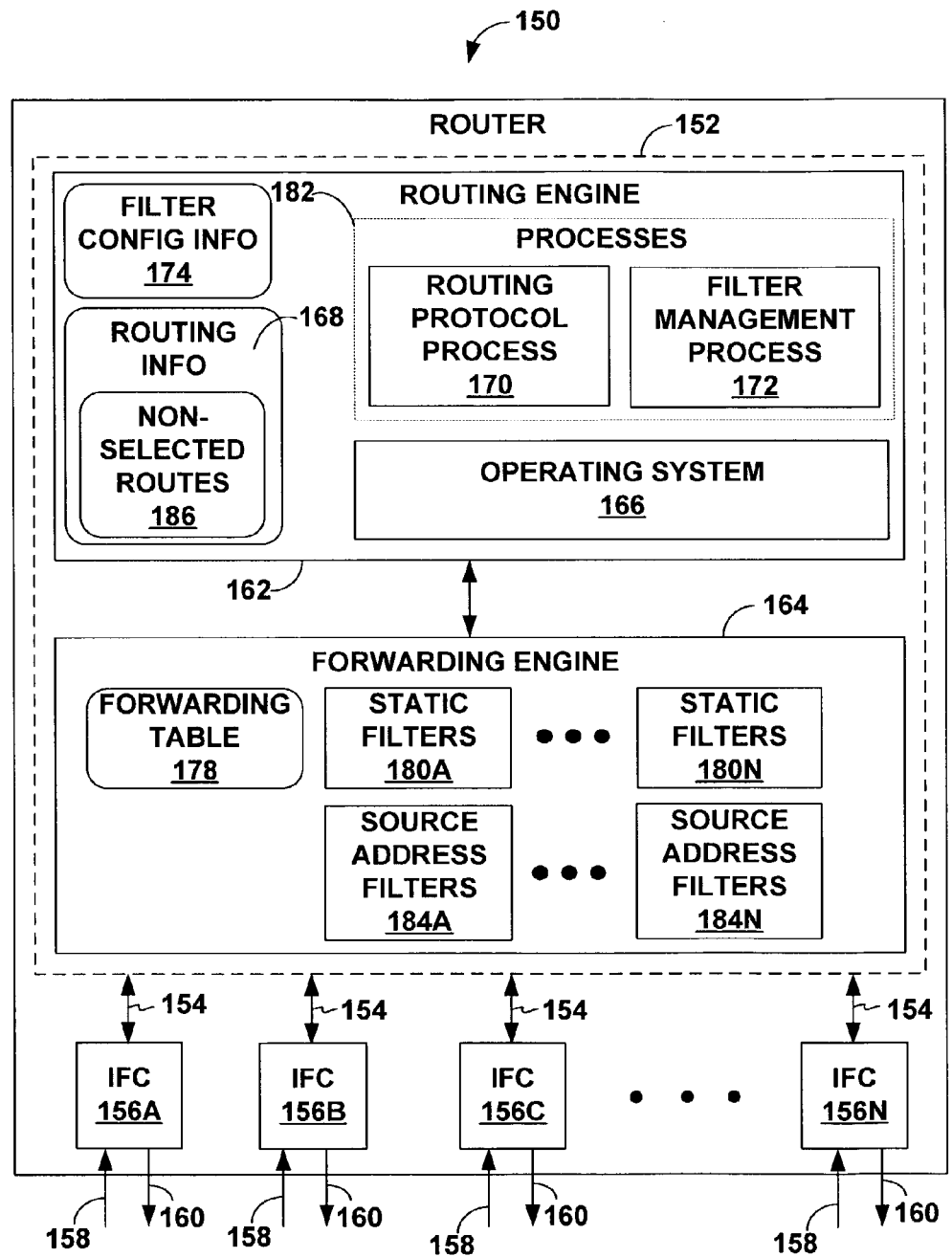
FIG. 8 is a block diagram illustrating another exemplary router that configures source address filters in accordance with the principles of the invention.

FIG. 8 is a block diagram illustrating another exemplary router 150 that automatically configures source address filters in accordance with the principles of the invention. Router 150 includes interface cards 156A-156N ("IFCs 156"), for receiving and sending data packets via network links 158 and 160, respectively. IFCs 156 are typically coupled to network links 158 and 160 via a number of interface ports (not shown). Each of IFCs 156 couples to a control unit 152 via at least one interface 154. Each physical interface 154 may correspond to one or more physical or logical interfaces.

Control unit 152 may comprise a routing engine 162 and a forwarding engine 164. Routing engine 162 includes an operating system 166 that provides a multi-tasking operating environment for execution of a number of concurrent processes 182. An example of such an operating system is FreeBSD, which is an advanced UNIX operating system that is compatible with a number of programmable processors, including processors commercially available.

Processes 182 executing on operating system 166 may include a routing protocol process 170 that implements complex routing protocols and other functions. Routing protocol process 170 includes one or more threads that implement the various network protocols supported by routing engine 162. Routing protocol process 170 may include, for example, threads that implement protocols, such as Border Gateway Protocol (BGP), for exchanging routing information 168 with other routing devices and for updating routing information 168. Routing information 168 may describe a topology of a network, and more particularly, routes through the network. In particular, routing information 168 describes various routes, including non-selected routes 186, within the network, and the appropriate next hops for each route, i.e., the neighboring devices of router 150 along each of the routes.

Routing engine 162 may process the routing information received via one or more routing protocols, such as BGP, and identify routes as being selected and non-selected. Furthermore, routing engine 162 may then update routing information 168, and in particular may update non-selected routes 186. Upon completing this process, router 150 may advertise the updated routing information, including information concerning non-selected routes, throughout the network based on policies (not shown), as described above.

Routing engine 162 further analyzes stored routing information 168 and generates at least one forwarding table 178 for forwarding engine 164. Forwarding table 178 may associate, for example, network destinations with specific next hops and corresponding IFCs 156. Forwarding table 178 need not be a table. For example, forwarding table 178 may be a link list, a radix tree, a database, a flat file, or various other data structures.

Processes 182 executing within routing engine 162 further include a filter management process 172 that manages network traffic filters within router 150. Filter management process 172 accesses filter configuration information ("FILTER CONFIG INFO") 174 and routing information 168, which includes information regarding non-selected routes 186, and directs forwarding engine 164 to implement source address filters 184A-184N ("source address filters 184"). The inclusion of non-selected routes 168 may allow filter management process 172 to more accurately set source address filters 184, as described above. Filter management process 172 processes routing information 168, including non-selected routes 186, to a set of valid source addresses for use by source address filters 184.

Router 150 may operate according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The functions of router 150 may be implemented by executing the instructions of the computer-readable medium with one or more processors, discrete hardware circuitry, firmware, software executing on a programmable processor, or a combination of any of the above.

Figure 9:
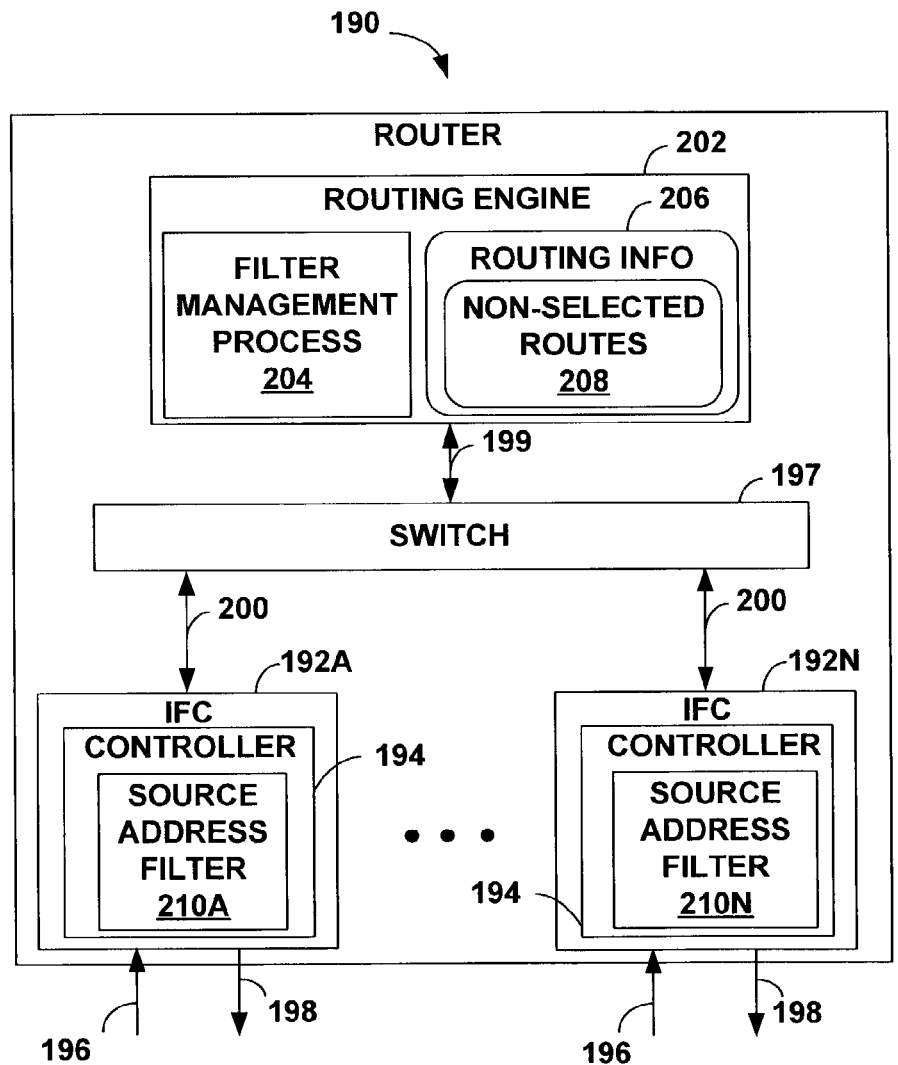
FIG. 9 is a block diagram illustrating another exemplary router.

FIG. 9 is a block diagram illustrating yet another exemplary router 190 that automatically configures source address filters in accordance with the principles of the invention. Router 190 includes a routing engine 202 that maintains routing information 206, including routing information pertaining to non-selected routes 208, that describes the topology of a network. Routing engine 202 analyzes stored routing information 206 and generates forwarding information (not shown) for interface cards 192A-192N ("IFCs 192"). In other words, in contrast to the exemplary router 150 of FIG. 8, router 190 does not include centralized forwarding hardware. In particular, router 190 distributes the forwarding functionality to IFCs 192.

IFCs 192 receive and send data packets via network links 196 and 198, respectively, and are interconnected by a high-speed switch 197 and links 200. Switch 197 may comprise, for example, switch fabric, switchgear, a configurable network switch or hub, and the like. Links 200 may comprise any form of communication path, such as electrical paths within an integrated circuit, external data busses, optical links, network connections, wireless connections, and the like. IFCs 192 may be coupled to network links 196, 198 via a number of interface ports (not shown). IFCs 192 comprise a controller 194 that forwards packets in accordance with forwarding information generated by routing engine 202.

Routing engine 202 further includes a filter management process 204 that manages filtering within router 190. Filter management process 204 provides for the setting of source address filters 210A-210N ("source address filters 210") within IFCs 192 based on routing information 208, which includes information regarding non-selected routes 208.

Controllers 194 determine the next hop for each of the packets from the distributed forwarding information but only after applying source address filters 210 to the inbound packets. If the source address of an inbound packet is valid, controllers 195 identifies a corresponding IFC 192 associated with the next hop, relays the packet to the appropriate IFC 194 via switch 197 and links 200. The controller 194 of the selected IFC 194 receives the outbound packet from switch 197, applies any filters associated with the outbound interface, and forwards the packet through an outbound link 198. In addition, router 190 may further generate and advertise routing information to specify selected and non-selected routes in a manner as described above.

Figure 10:
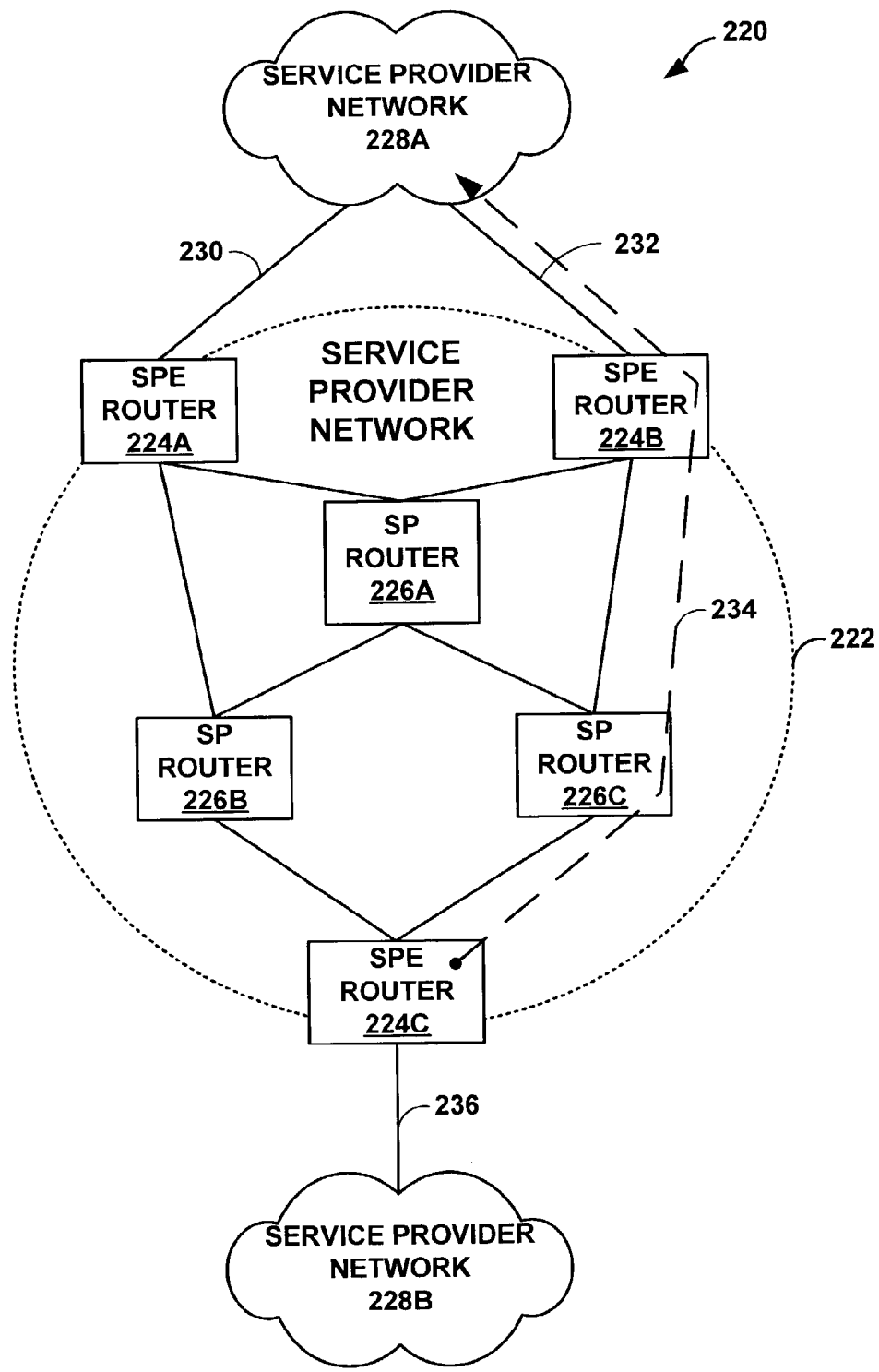
FIG. 10 is a block diagram illustrating yet another network environment that demonstrates the principles of the invention.

FIG. 10 is a block diagram illustrating yet another example network environment 220 that demonstrates the principles of the invention. As illustrated, service provider (SP) network 222 is coupled to a plurality of SP networks via links connected to SP edge (SPE) routers 224A, 224B, and 224C. For example, SP network 222 provides network connectivity to a plurality of SP networks 228A and 228B via links 230, 232 and 236. SPE routers 224A, 224B, 224C ("SPE routers 224") forward network traffic to and from SP networks 228A, 228B. SP routers 226A, 226B, 226C ("SP routers 66") represent routers internal to SP network 62. SP routers 226, as well as SPE routers 224, utilize internal and external routing protocols to exchange routing information concerning network routes within network environment 220.

As shown in FIG. 10, there exist multiple links from SP network 222 to SP network 228A. In particular, link 230, 232 connect SPE routers 224A, 224B, respectively, to SP network 228A. For illustration purposes SPE router 224A selects link 230 to reach a destination within SP network 228A and routes incorporating link 230 are the preferred routes to reach SP network 228A. Consequently, routes incorporating link 230 are referred to as a "selected" route, i.e., routes to a destination that router 224A selects for forwarding packets to that destination. Moreover, routes using link 232 are referred to as a "non-selected" route, i.e., routes, such as route 234, along which router 224B does not forward packets, but from which packets may be received. In accordance with the principles of the invention, SPE routers 224 and 226 announce routing information in accordance with internal and external routing protocols and identify both selected and non-selected network routes.

In the event, that link 230 fails, link 232 provides the only link between SP network 222 and SP network 228A. Without knowledge of non-selected routes, such as route 234, SPE routers 224 and SP routers 226 would have to advertise alternate routes to SP network 238A to reconfigure internal network topologies to represent the failure of link 230. In conventional systems, the resulting advertisement of alternate routes may cause unnecessary delay and decreased network efficiency. In accordance with the principles of the invention, the alternate routes are already included in exchanged routing information as non-selected routes, allowing each of SPE routers 224 and SP routers 226 to quickly reconfigure internal network topologies by specifying routes incorporating link 232 as selected routes to represent the failure of link 230. Furthermore, since the alternate routes were originally exchanged, routers 224, 226 do not need to further exchange routing information to represent the failure of link 230, thereby decreasing network traffic and improving network efficiency.

Various embodiments of the invention have been described. These and other embodiments are within the scope of the following claims. Although packet-based networks are described herein, other types of data units may also be used consistent with the principles of the invention. For instance, the term "packet" is used to generally describe a unit of data communicated between resources in conformance with a communication protocol. The principles of the invention may be readily applied to a variety of protocols, such as Transmission Control Protocol (TCP), the Internet Protocol (IP), Multi-protocol Label Switch (MPLS), Asynchronous Transfer Mode (ATM), Frame Relay, and the like. Accordingly, "packet" is used to encompass any such unit of data, and may be interchanged with the term "cell", or other similar terms used in such protocols to describe a unit of data communicated between resources within the network. These and other embodiments are within the scope of the following claims.

The invention claimed is:
1. A method comprising:
receiving, with a first network device, a routing communication from a second network device in accordance with a routing communication protocol, wherein the routing communication specifies at least one selected route along which the second network device forwards outbound data and at least one non-selected network route along which the second network device does not forward outbound data;
setting a source address filter within the first network device with a source address to permit the first network device to forward inbound data originating from a source along the non-selected route and corresponding to the source address in response to the received routing communication;

receiving the inbound data originating from the source along the non-selected route from the second network device;

applying the source address filter to compare a source address defined within the inbound data originating from the source along the non-selected route to the source address set within the source address filter;

forwarding the inbound data in accordance with routing information of the first network device only when the source address defined within the inbound data originating from the source along the non-selected route matches the source address set within the source address filter; and dropping the inbound data when the source address defined within the inbound data originating from the source along the non-selected route does not match the source address set within the source address filter.

2. The method of claim 1, wherein receiving a routing communication in accordance with a routing communication protocol comprises receiving information in accordance with one of a Border Gateway Protocol (BGP), Routing Information Protocol (RIP), Interior Gateway Protocol (IGP), Intermediate System to Intermediate System (IS-IS) protocol, and Open Shortest Path First (OSPF) protocol.

3. The method of claim 1, wherein the data comprises one of a packet and a cell.

4. The method of claim 1, wherein the first network device comprises a router.

5. The method of claim 1, further comprising setting the source address filter with a source address corresponding to a second source located along the selected route to permit the first network device to forward inbound data originating from the second source located along the selected route.

6. The method of claim 1, wherein the routing communication protocol is the Border Gateway Protocol (BGP).

7. An apparatus comprising:
a network interface card to receive a routing communication from a network device in accordance with a routing communication protocol, wherein the routing communication specifies at least one selected route, at least one non-selected network route, and a tag associated with the non-selected route to indicate that the network device does not forward outbound data along the non-selected route; and
a control unit to set a source address filter with a source address to permit the control unit to forward inbound data originating from a source along the non-selected route and corresponding to the source address in response to the received routing communication,
wherein the network interface card receives the inbound data originating from the source along the non-selected route from the network device,
wherein the control unit applies the source address filter to compare a source address defined within the inbound data originating from the source along the non-selected route to the source address set within the source address filter,
wherein the control unit forwards the inbound data only when the source address defined within the inbound data matches the source address set within the source address filter, and
wherein the control unit drops the inbound data when the source address defined within the inbound data originating from the source along the non-selected route does not match the source address set within the source address filter.

8. The apparatus of claim 7, wherein the control unit executes a routing process that processes the routing communication in accordance with the routing communication protocol, wherein the routing protocol includes one of a Border Gateway Protocol (BGP), a Routing Information Protocol (RIP), an Interior Gateway Protocol (IGP), a Intermediate System to Intermediate System (IS-IS) protocol, and an Open Shortest Path First (OSPF) protocol.

9. The apparatus of claim 7, wherein the control unit sets the source address filter with a source address corresponding to a second source located along the selected route to permit the first network device to forward inbound data originating from the second source located along the selected route.

10. The apparatus of claim 7, wherein the apparatus comprises a router and the inbound data comprises a packet.

11. The apparatus of claim 7, wherein the inbound data comprises an asynchronous transfer mode (ATM) cell.

12. A non-transitory computer-readable medium comprising instructions to cause a processor to:
receive from a network device a routing communication in accordance with a routing communication protocol, wherein the routing communication specifies at least one selected route along which the network device forwards outbound data and at least one non-selected network route along which the network device does not forward outbound data;
set a source address filter with a source address to permit forwarding inbound data originating from a source along the non-selected route and corresponding to the source address in response to the received communication
receiving the inbound data originating from the source along the non-selected route from the network device;
apply the source address filter to compare a source address defined within the inbound data originating from the source along the non-selected route to the source address set within the source address filter;
forward the inbound data only when the source address defined within the inbound data originating from the source along the non-selected route matches the source address set within the source address filter; and
drop the inbound data when the source address defined within the inbound data originating from the source along the non-selected route does not match the source address set within the source address filter.

13. The non-transitory computer-readable medium of claim 12, further comprising instructions to cause the processor to filter the inbound data based on a comparison between the source address and source addresses of inbound data.

14. A system comprising:
a first autonomous system having a first router; and
a second autonomous system having a second router,
wherein the first router sends a routing communication to the second router that specifies at least one selected route along which the first router forwards outbound packets and at least one non-selected network route along which the first router does not forward outbound packets and having at least one source of inbound packets,
wherein the second router automatically configures a source address filter to permit the second router to forward the inbound packets originating from the source of the non-selected route in response to the advertised routing information,
wherein the second router applies the source address filter to compare a source address defined within the inbound packets originating from the source of the non-selected route to the source address filter, wherein the second router forwards the inbound packets only when the source address defined within the inbound data originating from the source of the non-selected route matches the source address filter, and wherein the second router drops the inbound data when the source address defined within the inbound data originating from the source of the non-selected route does not match the source address set within the source address filter.

* * * * *